(12) United States Patent
Chen et al.

(10) Patent No.: US 9,963,296 B2
(45) Date of Patent: May 8, 2018

(54) COAL DROPPING IMPACT ENERGY BUFFER MONITORING DEVICE AND METHOD FOR COAL MINE BELT CONVEYING SYSTEM

(71) Applicant: CHINA UNIVERSITY OF MINING AND TECHNOLOGY, Jiangsu (CN)

(72) Inventors: Xiao Chen, Jiangsu (CN); Qianping Wu, Jiangsu (CN); Wei Li, Jiangsu (CN); Zhencai Zhu, Jiangsu (CN); Mingquan Qiu, Jiangsu (CN); Gongbo Zhou, Jiangsu (CN); Guohua Cao, Jiangsu (CN); Yuxing Peng, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days. days.

(21) Appl. No.: 15/537,523

(22) PCT Filed: Aug. 11, 2015

(86) PCT No.: PCT/CN2015/086608
§ 371 (c)(1),
(2) Date: Jun. 19, 2017

(87) PCT Pub. No.: WO2016/187963
PCT Pub. Date: Dec. 1, 2016

(65) Prior Publication Data
US 2018/0065811 A1    Mar. 8, 2018

(30) Foreign Application Priority Data
May 26, 2015    (CN) .......................... 2015 1 0273771

(51) Int. Cl.
*B65G 15/34*    (2006.01)
*B65G 15/22*    (2006.01)
*B65G 43/00*    (2006.01)

(52) U.S. Cl.
CPC ............. *B65G 15/34* (2013.01); *B65G 15/22* (2013.01); *B65G 43/00* (2013.01)

(58) Field of Classification Search
CPC ............................... B65G 15/34; B65G 15/22
(Continued)

(56) References Cited

U.S. PATENT DOCUMENTS 3,897,868 A * 8/1975 Smith, Jr. .............. B65G 43/08
    177/185
4,051,961 A * 10/1977 Williams .................. B60P 1/36
    198/301

(Continued)

OTHER PUBLICATIONS

International Search Report for Application No. PCT/CN2015/086608 dated Feb. 16, 2016.

*Primary Examiner* — Joseph Dillon, Jr.
(74) *Attorney, Agent, or Firm* — Marshall, Gerstein & Borun LLP

(57) ABSTRACT

A coal dropping impact energy buffer monitoring device and method for a coal mine belt conveying system. The device comprises a buffer belt roller group, a buffer bracket, buffer springs, impact energy collecting dampers, a signal converting and sending device, and an installation bottom board, the buffer belt roller group being fixed to the buffer bracket, the upper ends and the lower ends of the buffer springs and the impact energy collecting dampers being respectively connected to the buffer bracket and the installation bottom board, and the impact energy collecting dampers being connected to the signal converting and sending device fixed to the installation bottom board through guide lines.

5 Claims, 3 Drawing Sheets

(58) Field of Classification Search
USPC .................................................. 198/860.3
See application file for complete search history.

(56) References Cited

U.S. PATENT DOCUMENTS

| | | | | |
|---|---|---|---|---|
| 4,144,965 A * | 3/1979 | Alldredge | .............. | B65G 21/22 198/838 |
| 4,482,046 A * | 11/1984 | Kraus | .................... | B65G 27/04 198/771 |
| 4,771,894 A * | 9/1988 | Lapp | ........................ | B03B 9/061 198/770 |
| 4,884,696 A * | 12/1989 | Peleg | ........................ | B07C 5/00 198/408 |
| 5,125,140 A * | 6/1992 | Sticht | .................... | B23P 21/004 198/860.2 |
| 5,381,882 A * | 1/1995 | Ostholt | ................ | B65G 47/962 198/802 |
| 6,659,269 B1 * | 12/2003 | Roberts | .................. | B65G 15/00 198/594 |
| 6,763,935 B2 * | 7/2004 | Ostman | .............. | B65G 21/2081 198/836.1 |
| 9,670,003 B2 * | 6/2017 | Ferguson | ................ | B65G 39/12 |
| 2007/0108023 A1 * | 5/2007 | Mathis, Jr. | .................. | F23J 1/02 198/752.1 |
| 2009/0321224 A1 * | 12/2009 | Johanssen | ............... | B65G 21/08 198/860.3 |
| 2011/0094860 A1 * | 4/2011 | Lenord | .................. | B65G 23/10 198/832 |
| 2014/0327383 A1 * | 11/2014 | Turner | ................ | G01G 11/043 318/490 |
| 2016/0107840 A1 * | 4/2016 | DeGroot | ............... | B65G 23/44 198/617 |
| 2016/0289007 A1 * | 10/2016 | Maggioni | ............. | B65G 27/00 |
| 2016/0340127 A1 * | 11/2016 | Ferguson | ............... | B65G 39/12 |
| 2017/0052057 A1 * | 2/2017 | Turner | ................ | G01G 11/003 |

* cited by examiner

COAL DROPPING IMPACT ENERGY BUFFER MONITORING DEVICE AND METHOD FOR COAL MINE BELT CONVEYING SYSTEM

FIELD OF THE INVENTION

The present invention relates to impact energy buffering and monitoring device and method for a belt conveying system at a material falling position, which are especially suitable for buffering and monitoring the impact energy at the material falling position of a belt-type conveying system that has long conveying distance, heavy load, and high conveying speed in a coal mine.

BACKGROUND OF THE INVENTION

Belt conveyers are widely used in main underground and ground coal haulage roadways, and are "main arteries" for production in coal mines, owing to their advantages such as high conveying capacity, simple structure, and long conveying distance, etc. As the most important drive component as well as the most expensive and most vulnerable component in a belt-type conveying system, a conveyer belt is often damaged owing to the impact of falling material at the head of the conveyer, bringing severe loss to the coal mine. To reduce the damage of the impact on the conveyer belt at the coal falling position, a method commonly used presently is to add buffer rollers or a buffer bed at the coal falling position at the head part of the conveyer. Wherein, buffer rollers may be damaged easily by the impact force of falling coal, owing to their small bearing points. A buffer bed must have a highly elastic special rubber layer in order to reduce the friction force between the belt and the buffer medium; therefore, the requirement for the material is high. Both of the schemes cannot meet the present requirement well.

In addition, the coal falling position belongs to a region that is directly subject to the influences of coal piling accidents of the belt conveyer. According to the Coal Mine Safety Code, protective measures for coal piling must be taken during the operation of a belt conveyer. Existing coal piling protection devices are mainly stockpiling triggering devices added at the upper port of a coal bunker or the lap joint between two belt conveyers, but such devices have problems, for example, they are susceptible to moisture influence and are not sensitive to lump coal.

Therefore, a buffering and bearing device that can resist the impact of falling coal and has less friction with the belt must be developed to alleviate the damage of the impact force of falling coal to the belt; in addition, the impact force of falling coal must be monitored effectively, in order to learn about the coal falling situation and realize coal piling protection.

Contents of the Invention

Object of the Invention:

In view of the problem of damage of impact force of falling coal to the belt of large-size belt conveyer at the material falling position, to overcome the drawbacks in the prior art, the present invention designs device and method that can alleviate the damage of impact force of falling coal to the belt and monitor the coal falling situation.

To attain the object described above, the present invention employs the following technical scheme: a coal-falling impact energy buffering and monitoring device for a belt-type conveying system in a coal mine, comprising a buffer belt drum set, a buffer bracket, buffer springs, an impact energy collecting damper, a signal converting-transmitting device, and a mounting base plate; the buffer belt drum set is fixed to the buffer bracket, the upper ends of the buffer springs are connected with the buffer bracket via a boss, the lower end of the buffer springs are connected with the mounting base plate via a boss, the upper end of the impact energy collecting damper is connected with the buffer bracket, the lower end of the impact energy collecting damper is connected with the mounting base plate, the impact energy buffer damper is connected with the signal converting-transmitting device through lead wires, and the signal converting-transmitting device is fixed to the mounting base plate.

In the present invention, preferably, the buffer belt drum set comprises a horizontal buffer belt drum set and an inclined buffer belt drum set arranged symmetrically at two sides of the horizontal buffer belt drum set, and the inclined buffer belt drum set is inclined upwards; both the horizontal buffer belt drum set and the inclined buffer belt drum set comprise several drum set units that are equal in quantity and evenly spaced, each drum set unit comprises at least two drums fitted over rollers, and a rubber ring is fitted over the drums.

In the present invention, preferably, first rubber strips are provided on the upper ends of the rollers of the inclined buffer belt drum set, and the first rubber strips are fixed to the buffer bracket by bolts; second rubber strips are provided on two ends of the rollers of the horizontal buffer belt drum set, and the second rubber strips are fixed to the buffer brackets by sunk screws.

In the present invention, preferably, the buffer bracket comprises a plate stiffener, a horizontal plate stiffener, and a vertical plate stiffener; a plate stiffener and a vertical plate stiffener paralleled to the horizontal buffer belt drum set are arranged below the horizontal buffer belt drum set, and a plate stiffener and a horizontal plate stiffener paralleled to the inclined buffer belt drum set are arranged below the inclined buffer belt drum set.

In the present invention, preferably, the impact energy buffer damper comprises an upper rubber isolating layer, a permanent magnet, a coil, an explosion-proof enclosure, and a threaded rotating body, the upper rubber isolating layer and the permanent magnet are fixed to the buffer bracket via the threaded rotating body, the coil is fitted over the permanent magnet, and a part of the coil in contact with the permanent magnet encloses the explosion-proof enclosure.

In the present invention, preferably, the signal converting-transmitting device comprises a rectifier device, which is connected with the impact energy collecting damper and an inverter respectively, the inverter is connected with a current measurement device, the current measurement device is connected with a wireless router, and the wireless router is connected with a plate antenna.

A call-falling impact energy buffering and monitoring method for a belt-type conveying system in a coal mine, comprising: mounting the coal-falling impact energy buffering and monitoring device described above right below the belt of a belt-type conveying system at a material falling position, converting the impact force suffered by the belt at the coal falling position into an electrical signal with an impact energy collecting damper, transmitting the electrical signal received by a signal converting-transmitting device to an upper computer, judging the material falling situation (falling situation including three situations: no falling material, normal material falling, and material falling overload) with the upper computer according to the signal, at the same time, retrieving the data from a weighing system of an upstream belt conveyer with the upper computer to judge whether the upstream belt conveyer operates normally or not; if the upstream belt conveyer operates normally but the material falling situation is "no falling material" or "material falling overload", which indicates a stockpiling fault has occurred, shutting down a first belt driving motor of the upstream belt conveyer and a second belt driving motor of the belt-type conveying system at the same time via the upper computer.

Beneficial Effects:

The coal-falling impact energy buffering and monitoring device provided in the present invention employs a buffer bracket and a buffer spring damper to realize multi-layer buffering, and the main buffer damper part is moved to the bottom part of the device; thus, the friction force between the belt and the buffer device is reduced on the basis of the protection for buffer belt drum set; in addition, the damped energy is collected, the coal falling situation is analyzed, and the controller is used in combination to attain an effect of preventing coal piling faults.

In the figures: 1—buffer belt drum set; 2—buffer bracket; 3—buffer spring; 4—impact energy collecting damper; 5—signal converting-transmitting device; 6—mounting base plate; 1-1—rubber ring; 1-2—drum set; 2-1—parallel plate stiffener; 2-2—horizontal plate stiffener; 2-3—vertical plate stiffener; 3-1—second rubber strip; 3-2—sunk screw; 3-3—bolt; 3-4—first rubber strip; 4-1—isolating layer; 4-2—permanent magnet; 4-3—coil; 4-4—explosion-proof enclosure; 4-5—threaded rotating body; 7—coal-falling impact energy buffering and monitoring device; 8—belt-type conveying system; 9—upper computer; 10—upstream belt conveyer; 11—weighing system; 12—first belt driving motor; 13—second belt driving motor.

Embodiments

Hereunder the present invention will be further detailed, with reference to the accompanying drawings.

Figure 1:
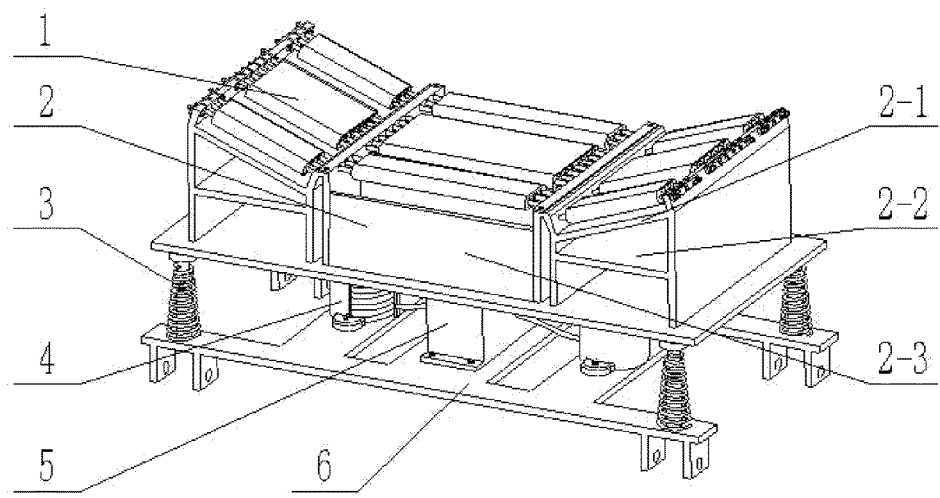
FIG. 1 is a general assembly diagram of the coal-falling impact energy buffering and monitoring device in the present invention.

As shown in FIG. 1, the coal-falling impact energy buffering and monitoring device for a belt-type conveying system in a coal mine provided in the present invention comprises a buffer belt drum set 1, a buffer bracket 2, a buffer spring 3, an impact energy collecting damper 4, a signal converting-transmitting device 5, and a mounting base plate 6. The buffer belt drum set 1 is fixed to the buffer bracket 2, the upper ends of the buffer springs 3 are connected with the buffer bracket 2 via a boss, the lower end of the buffer springs 3 are connected with the mounting base plate 6 via a boss, the upper end of the impact energy collecting damper 4 is fixedly connected with the buffer bracket 2 by welding, the lower end of the impact energy collecting damper 4 is connected with the mounting base plate 6 by bolts, the impact energy buffer damper 4 is connected with the signal converting-transmitting device 5 through lead wires, and the signal converting-transmitting device 5 is fixed to the mounting base plate 6 by bolts.

Figure 2:
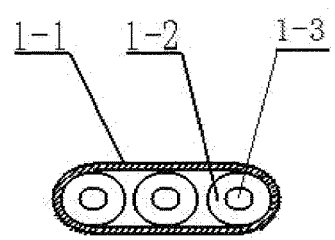
FIG. 2 is a front view of the drum set unit in the present invention.
Figure 3:
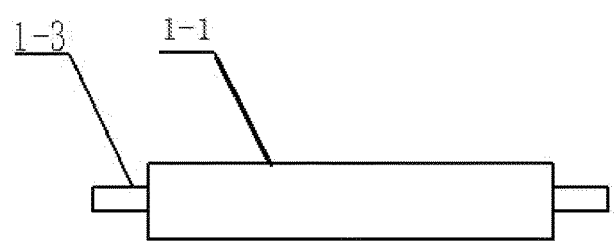
FIG. 3 is a side view of the drum set unit in the present invention.

As shown in FIGS. 1-3, the buffer belt drum set 1 comprises a horizontal buffer belt drum set and an inclined buffer belt drum set arranged symmetrically at two sides of the horizontal buffer belt drum set, and the inclined buffer belt drum set is inclined upwards; both the horizontal buffer belt drum set and the inclined buffer belt drum set comprise several drum set units that are equal in quantity and evenly spaced, each drum set unit comprises at least two drums 1-2 fitted over rollers 1-3, and a rubber ring 1-1 is fitted over the drums 1-2. The buffer bracket 2 comprises a plate stiffener 2-1, a horizontal plate stiffener 2-2, and a vertical plate stiffener 2-3; a plate stiffener 2-1 and a vertical plate stiffener 2-3 paralleled to the horizontal buffer belt drum set are arranged below the horizontal buffer belt drum set, and a plate stiffener 2-1 and a horizontal plate stiffener 2-2 paralleled to the inclined buffer belt drum set are arranged below the inclined buffer belt drum set.

Figure 4:
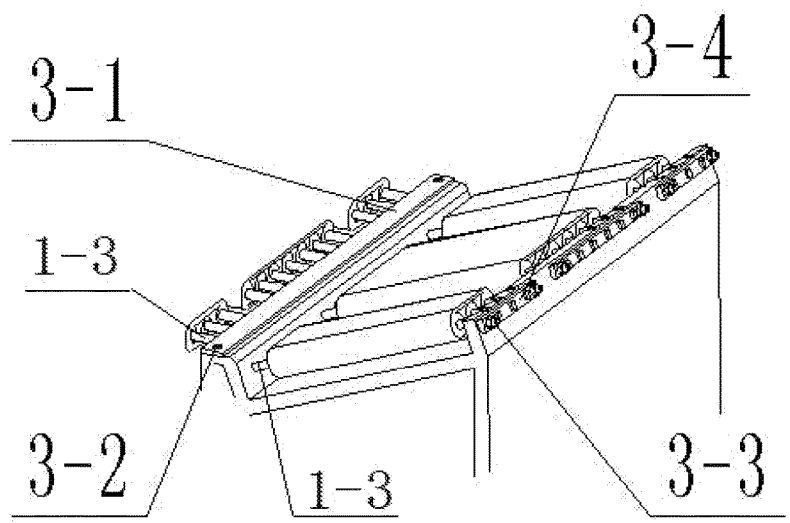
FIG. 4 is a structural installation diagram of the drum set unit in the present invention.

As shown in FIGS. 2-4, first rubber strips 3-4 are provided on the upper ends of the rollers 1-3 of the inclined buffer belt drum set, and the first rubber strips 3-4 are fixed to the buffer bracket 2 by bolts 3-3; second rubber strips 3-1 are provided on two ends of the rollers 1-3 of the horizontal buffer belt drum set, and the second rubber strips 3-1 are fixed to the buffer brackets 2 by sunk screws 3-2. Since the design effective length of the rubber ring 1-1 is smaller than the mounting distance between two outer rollers 1-3 of the drum set unit, the rubber ring 1-1 will be tensioned up once the two outer rollers 1-3 are mounted.

Figure 5:
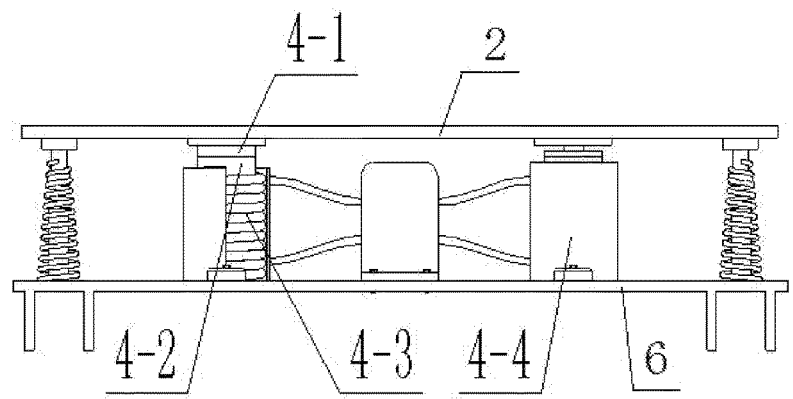
FIG. 5 is structural diagram I of the impact energy buffer damper in the present invention.
Figure 6:
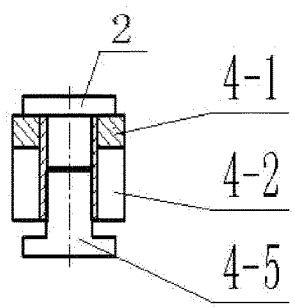
FIG. 6 is structural diagram II of the impact energy buffer damper in the present invention.

As shown in FIGS. 5 and 6, the impact energy buffer damper 4 comprises an upper rubber isolating layer 4-1, a permanent magnet 4-2, a coil 4-3, an explosion-proof enclosure 4-4, and a threaded rotating body 4-5, the upper rubber isolating layer 4-1 and the permanent magnet 4-2 are fixed to the buffer bracket 2 via the threaded rotating body 4-5, the coil 4-3 is fitted over the permanent magnet 4-2, a part of the coil 4-3 in contact with the permanent magnet 4-2 encloses the explosion-proof enclosure 4-4, the coil 4-3 and the permanent magnet 4-2 are integrally sealed by the explosion-proof enclosure 4-4.

Figure 7:
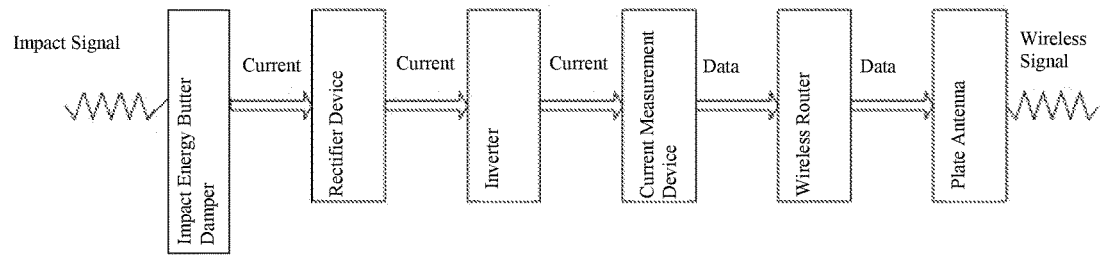
FIG. 7 is a structural diagram of the signal converting-transmitting device in the present invention.

As shown in FIG. 7, the signal converting-transmitting device 5 comprises a rectifier device, an inverter, a current measurement device, a plate antenna, and a wireless router. The rectifier device is connected with the impact energy collecting damper 4 and the inverter respectively, the inverter is connected with the current measurement device, the current measurement device is connected with the wireless router, and the wireless router is connected with a plate antenna. Under the vibration generated by the coal falling impact, the permanent magnet 4-2 of the impact energy collecting damper 4 is driven to vibrate up and down, induced current that is very unsteady is generated in the coil 4-3, the induced current is rectified by the rectifier device and then flows into the follow-up inverter and forms usable alternating current, the current measurement device detects the magnitude of the current and generates data information, a LAN and a WAN is connected via the wireless router in real time, the wireless router serves as a repeater, and the data information is transmitted by the plate antenna in the form of radio waves.

Figure 8:
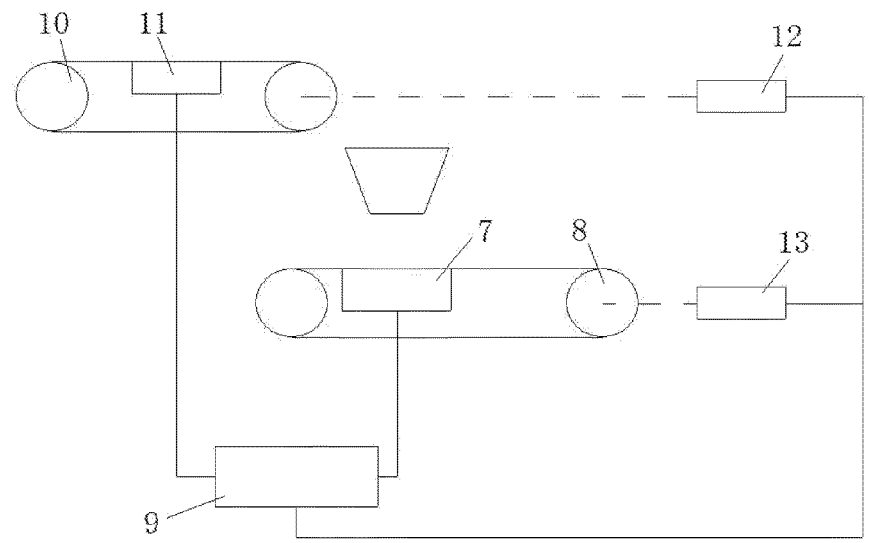
FIG. 8 is a schematic implementation diagram of the coal-falling impact energy buffering and monitoring method in the present invention.

As shown in FIG. 8, the coal-falling impact energy buffering and monitoring method for a belt-type conveying system in a coal mine in the present invention is as follows: the coal-falling impact energy buffering and monitoring device 7 described above is mounted right below the belt of a belt-type conveying system 8 at a material falling position via four card slots of the mounting base plate 6, with 10 mm clearance kept between the upper surface of the coal falling impact energy buffering and monitoring device 7 and the belt of the belt-type conveying system 8, the impact energy collecting damper 4 converts the impact force suffered by the belt at the coal falling position into an electrical signal, the signal converting-transmitting device 5 transmits the received electrical signal to an upper computer 9, the upper computer 9 judges the material falling situation (the material falling situation including three situations: no falling material, normal material falling, and material falling overload) according to the signal, at the same time, the upper computer 9 retrieves the data from a weighing system 11 of an upstream belt conveyer 10 to judge whether the upstream belt conveyer 10 operates normally or not; if the upstream belt conveyer 10 operates normally but the coal falling situation is "no falling material" or "material falling overload", which indicates a stockpiling fault has occurred, a first belt driving motor 12 of the upstream belt conveyer 10 and a second belt driving motor 13 of the belt-type conveying system 8 are shut down at the same time via the upper computer 9.

While the present invention has been illustrated and described with reference to some preferred embodiments, the present invention is not limited to these. Those skilled person in the art should recognize that various variations and modifications can be made without departing from the spirit and scope of the present invention. All of such variations and modifications shall be deemed as falling into the protected scope of the present invention.

The invention claimed is:

1. A coal-falling impact energy buffering and monitoring device for a belt-type conveying system in a coal mine, wherein, the coal-falling impact energy buffering and monitoring device comprises a buffer belt drum set, a buffer bracket, buffer springs, an impact energy collecting damper, a signal converting-transmitting device, and a mounting base plate; the buffer belt drum set is fixed to the buffer bracket, the upper ends of the buffer springs are connected with the buffer bracket via a boss, the lower end of the buffer springs are connected with the mounting base plate via a boss, the upper end of the impact energy collecting damper is connected with the buffer bracket, the lower end of the impact energy collecting damper is connected with the mounting base plate, the impact energy buffer damper is connected with the signal converting-transmitting device through lead wires, and the signal converting-transmitting device is fixed to the mounting base plate wherein the buffer belt drum set comprises a horizontal buffer belt drum set and an inclined buffer belt drum set arranged symmetrically at two sides of the horizontal buffer belt drum set, and the inclined buffer belt drum set is inclined upwards; both the horizontal buffer belt drum set and the inclined buffer belt drum set comprise several drum set units that are equal in quantity and evenly spaced, each drum set unit comprises at least two drums fitted over rollers, and a rubber ring is fitted over the drums and wherein first rubber strips are provided on the upper ends of the rollers of the inclined buffer belt drum set, and the first rubber strips are fixed to the buffer bracket by bolts; second rubber strips are provided on two ends of the rollers of the horizontal buffer belt drum set, and the second rubber strips are fixed to the buffer brackets by sunk screws.

2. The coal-falling impact energy buffering and monitoring device for a belt-type conveying system in a coal mine according to claim 1, wherein, the buffer bracket comprises a plate stiffener, a horizontal plate stiffener, and a vertical plate stiffener; a plate stiffener and a vertical plate stiffener paralleled to the horizontal buffer belt drum set are arranged below the horizontal buffer belt drum set, and a plate stiffener and a horizontal plate stiffener parallel to the inclined buffer belt drum set are arranged below the inclined buffer belt drum set.

3. The coal-falling impact energy buffering and monitoring device for a belt-type conveying system in a coal mine according to claim 1, wherein, the impact energy buffer damper comprises an upper rubber isolating layer, a permanent magnet, a coil, an explosion-proof enclosure, and a threaded rotating body, the upper rubber isolating layer and the permanent magnet are fixed to the buffer bracket via the threaded rotating body, the coil is fitted over the permanent magnet, and a part of the coil in contact with the permanent magnet encloses the explosion-proof enclosure.

4. The coal-falling impact energy buffering and monitoring device for a belt-type conveying system in a coal mine according to claim 1, wherein, the signal converting-transmitting device comprises a rectifier device, which is connected with the impact energy collecting damper and an inverter respectively, the inverter is connected with a current measurement device, the current measurement device is connected with a wireless router, and the wireless router is connected with a plate antenna.

5. A coal-falling impact energy buffering and monitoring method for a belt-type conveying system in a coal mine, wherein, mounting the coal-falling impact energy buffering and monitoring device according to claim 1 right below the belt of a belt-type conveying system at a material falling position, converting the impact force suffered by the belt at the coal falling position into an electrical signal with an impact energy collecting damper, transmitting the electrical signal received by a signal converting-transmitting device to an upper computer, judging the material falling situation with the upper computer according to the signal, the material falling situation includes three situations: no falling material, normal material falling, and material falling overload, at the same time, retrieving the data from a weighing system of an upstream belt conveyer with the upper computer to judge whether the upstream belt conveyer operates normally or not; if the upstream belt conveyer operates normally but the material falling situation is "no falling material" or "material falling overload", which indicates a stockpiling fault has occurred, shutting down a first belt driving motor of the upstream belt conveyer and a second belt driving motor of the belt-type conveying system at the same time via the upper computer.

* * * * *

UNITED STATES PATENT AND TRADEMARK OFFICE
CERTIFICATE OF CORRECTION

PATENT NO.        : 9,963,296 B2
APPLICATION NO.   : 15/537523
DATED             : May 8, 2018
INVENTOR(S)       : Xiao Chen et al.

Page 1 of 1

It is certified that error appears in the above-identified patent and that said Letters Patent is hereby corrected as shown below:

On the Title Page

In Column 1, under item "Notice", Line 3, "0 days. days." should be -- 0 days. --.

Signed and Sealed this
Eighteenth Day of September, 2018

Andrei Iancu
*Director of the United States Patent and Trademark Office*